Figure 1:
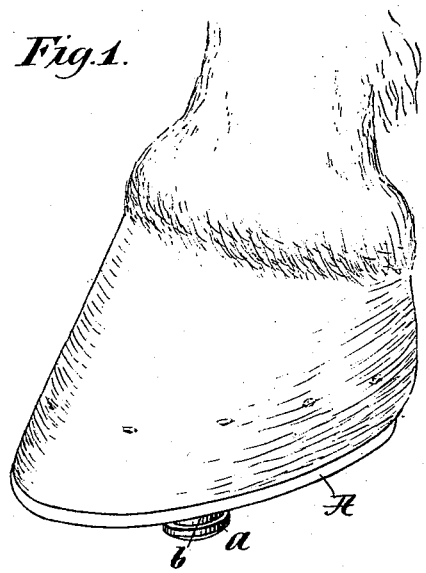

(No Model.)

J. B. BURR.
HORSESHOE.

No. 507,525. Patented Oct. 31, 1893.

Witnesses:
Edward Thorpe
J. A. Dunn

Inventor:
James B. Burr,
By Philipp Munson & Phelps.
Att'ys

UNITED STATES PATENT OFFICE.

JAMES B. BURR, OF BAYSHORE, NEW YORK.

HORSESHOE.

SPECIFICATION forming part of Letters Patent No. 507,525, dated October 31, 1893.

Application filed March 23, 1893. Serial No. 467,264. (No model.)

*To all whom it may concern:*

Be it known that I, JAMES B. BURR, a citizen of the United States, residing at Bayshore, county of Suffolk, and State of New York, have invented certain new and useful Improvements in Horseshoes, fully described and represented in the following specification and the accompanying drawings, forming a part of the same.

This invention relates to improvements in horseshoes; the improvements constituting the invention having for their object the provision of a shoe which will prevent interfering.

Interference in horses' legs is almost wholly confined to horses which are low on the insides of their hoofs and which "toe out," or in other words turn their toes out and their heels in; the ankle of the horse of course following the heel and turning or "wringing" in when placed upon the ground into the path of movement of the opposite leg when the latter is in motion, the hoof or knee of which latter leg, in passing the leg at rest, striking the same at the knee, ankle or hoof producing knee knocking, ankle cutting or hoof chafing, and also in some cases producing dislocation of the stifle. "Boots," as they are termed, placed about the interfering parts of the horse's legs, and also special constructions of shoes have heretofore been provided by which it has been sought to prevent such interference. In the case of the "boots," the cutting and chafing have, it is true, been to some extent diminished, (direct contact with the interfering parts being prevented by the boots,) but the evil has not been wholly remedied and the liability of dislocation of the stifle still exists. In the case of the special constructions of shoes referred to it has been proposed by "throwing" the hoof and ankle as they leave the ground outward from the opposite leg to compel them to take such position relatively to the opposite leg at rest that in passing the latter they will do so without striking. This "throwing" of the hoof and ankle however, is very objectionable and is liable to injure or pain the horse.

It is the object of the present invention to overcome this difficulty and to provide a shoe by which the necessary movement of the ankle will be secured without "throwing" but by a very easy and natural movement turning the foot as on a pivot toe inward, thus taking the ankle and other parts of the leg which are likely to interfere out of the path of movement of the opposite leg in moving forward past it, and this without any inconvenience or discomfort to the horse.

To this end the invention consists of a shoe provided with a bearing projecting downwardly therefrom beyond the other treading portions of the shoe which, under the weight of the horse as the hoof strikes the ground will, acting as a pivot, turn the foot toe inward and ankle outward.

As a full understanding of the invention can best be had from a detailed description of a shoe embodying the same all further preliminary description will be omitted and such detailed description be given in connection with the shoe illustrated in the accompanying drawings which embodies the invention in what is considered its preferred form.

Figure 2:
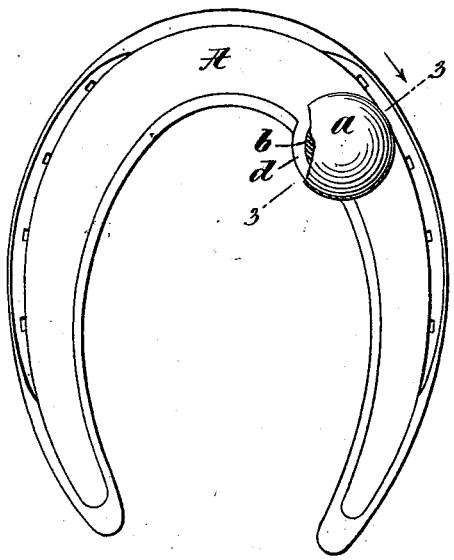
Figure 3:
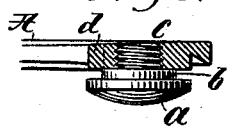

In said drawings:—Figure 1 illustrates a horse's hoof shod with a shoe containing the present invention; the hoof shown being the hoof of the right foreleg of the horse. Fig. 2 is a bottom plan view of the shoe removed from the hoof; and Fig. 3 is a section on the line 3—3 of Fig. 2.

Referring to said drawings, it will be seen that the shoe proper A illustrated therein is, except in two particulars which will hereinafter be pointed out, of the ordinary form of calkless shoe. The under or treading surface of the inner half of the shoe, or the half which is toward the other leg, is provided with a foot-turning bearing which projects downwardly beyond the other portions of the treading surface of the shoe and which may be formed upon or applied to the shoe in any suitable manner. As shown this bearing consists of a circular disk or button $a$ having a smooth rounded bearing surface and is provided with a shank $b$ which may be integral therewith or secured thereto in any suitable manner. The shank $b$ is screw threaded and the shoe is provided with a correspondingly screw threaded opening $c$ to receive it.

The foot-turning bearing may be applied to the inner half of the shoe at any desired point, which will be sufficiently near the forward end of the shoe to produce an inward movement of the toe and outward movement of the heel and ankle, but it will preferably be applied near the toe of the shoe at about the point indicated in the drawings which I have found to be the most advantageous position, namely, at or about the middle of the first quarter of the inner half of the shoe, or, in other words, between the two first nail holes. Though this is the preferred position of the bearing, it may be varied, if desired, without departing from my invention, so long as the bearing is so positioned relatively to the toe and heel as to turn the foot when the horse throws his weight upon it toe inward and heel and ankle outward.

The operation of the bearing is as follows:— When the horse places its foot shod with a shoe containing the bearing just described upon the ground and throws its weight upon that foot, the part of the shoe most affected and first affected by this weight is that carrying the bearing. With the bearing located, as shown, at the forward end of the inner half of the shoe the effect of the weight upon the bearing will be to cause the shoe and foot to turn upon the bearing as a pivot slightly heel outward and toe inward and thus carry the ankle of that leg out slightly but sufficiently to be out of the way of the opposite leg, which is then in motion and which will thus pass it without striking. The hoof of the opposite leg being also provided with a shoe containing the bearing, the ankle of the latter will as soon as the weight of the horse is thrown upon that leg also be carried out of the path of movement to be taken by the leg now at rest, so that the latter will clear it also without striking. The action of the bearing upon the hind legs of the horse is precisely the same as in the case of the forelegs. To obtain a greater bearing upon the inner half of the hoof which will act as a brace for the button $a$ and assist the latter in carrying the ankle outward I make the inner half of the shoe somewhat longer than the outer half, as indicated.

I have found it most advantageous to secure the button $a$ to the shoe by screwing the button into the shoe, as shown in the drawings, but it may be secured in any other suitable manner, if desired. Any other suitable form of bearing may also be employed, if desired, provided it be of such construction as not to offer any resistance to the turning of the foot as described. The screw thread connection between the button and shoe is preferred, because with it the extent to which the bearing will extend beyond the treading surface of the shoe may be varied to suit different roads or different horses by screwing or unscrewing the shank $b$ into or out of the shoe. When a screw threaded connection is used between the shank and shoe the screw threads will preferably be cut in the direction shown, that is to say in such manner that if during the turning of the foot outward the button and its shank should not move with the shoe, the shank will be drawn farther into the opening $c$. If the screw threads were arranged otherwise the shank $b$ would in such case in time prebably become detached from the shoe. With the screw connection, also, old buttons may readily be removed and renewed or adjusted without removing the shoe.

When the bearing is applied to the shoe in the manner shown in the drawings, I prefer, in order not to weaken the shoe in drilling the opening $c$ for receiving the shank of the button by cutting away the material of the shoe, to provide the inner edge of the inner half of the shoe with an extension $d$ through which the opening $c$ is partly drilled.

The size of the button and the extent to which it may project beyond the treading surface of the shoe may be varied as desired to suit variations in the extent to which different horses "wring in" or to suit different conditions of roads. In the case of soft roads the bearing should of course project farther beyond the treading surface of the shoe than in the case of hard roads.

Although the invention is shown and has been described as applied to calkless shoes, it is to be understood that it is equally applicable to shoes provided with calks, and they will probably when they are to be used on ice, have to be calked. It is preferred, however, that the shoes be calkless if possible, as calks might be liable to interfere somewhat with the action of the bearing by their tendency to hold the foot where the horse places it upon the ground. If occasion should require the use of calks however, as in the case of ice, the calks must be of such size or so arranged relatively to the foot-turning bearing that the latter will project downwardly beyond them in order that the calks may not interfere with the operation of the bearing.

The advantages resulting from my invention are many. The "bringing off" produced by the bearing is not painful or even uncomfortable or in any way harmful to the horse, the ankle moving off easily with the motion of the horse, and, while compelling, as it does, the one leg to move out of the way of the other, it absolutely avoids the pain and injury resulting to the horse from cuts, chafing and dislocation of the stifle due to "wringing in."

In the use of shoes containing the present invention certain changes will be found advantageous in the method of forging shoes and preparing the hoofs for their reception in that the inner half of the shoe will preferably be somewhat longer than the outer, instead of shorter, and will be as thick and as broad as the outer half instead of thinner and narrower, and if any paring or filing be found necessary such paring or filing will be done upon the outer half of the hoof instead of the inner; the thinning of the inner half of the shoe and the lengthening of the outer half together with the paring of the inner half of the hoof all producing a tendency in the ankle to "wring in." The paring and filing of the inner half of the hoof is also objectionable in that when the shoe is applied to the hoof it rests upon the sole of the foot, which is injurious, and prevents the driving in of all the nails. With my invention whatever paring may be found necessary or desirable should be confined to the outer half of the hoof, as it will thus be possible to preserve the feet in much better condition than under the old system.

What I claim is—

1. A horseshoe provided with a foot-turning bearing upon the forward portion of the inner half thereof projecting downwardly beyond the other portions of the shoe and acting under the weight of the horse to turn its foot as it strikes the ground toe-inward, substantially as described.

2. A horse shoe provided with a foot-turning bearing at or about the middle of the first quarter of the inner half thereof projecting downwardly beyond the other portions of the shoe and acting under the weight of the horse to turn its foot as it strikes the ground toe-inward, substantially as described.

3. A horseshoe provided with a rounded foot-turning bearing upon the forward portion of the inner half thereof projecting downwardly beyond the other portions of the shoe and adapted under the weight of the horse to turn its foot as it strikes the ground toe inward, substantially as described.

4. A horseshoe provided with a rounded foot turning bearing at or about the middle of the first quarter of the inner half thereof projecting downwardly beyond the other portions of the shoe and adapted under the weight of the horse to turn its foot as it strikes the ground toe inward, substantially as described 5. A horseshoe provided with a foot-turning bearing consisting of a button having a rounded under side applied to the treading surface of the inner half of the shoe projecting downwardly beyond the other portions of the shoe and adapted under the weight of the horse to turn its foot as it strikes the ground toe inward, substantially as described.

6. A horseshoe provided with a foot-turning bearing consisting of a button having a rounded under side applied to the treading surface of the inner half of the shoe at or about the middle of the first quarter thereof, projecting downwardly beyond the other portions of the shoe and adapted under the weight of the horse to turn its foot as it strikes the ground toe inward, substantially as described.

7. A horseshoe provided with a foot-turning bearing consisting of a button secured to the inner half of the shoe by screw threads and adapted under the weight of the horse to turn its foot toe-inward, the screw-threads in the shoe and button being cut reversely to the direction of movement of the foot when turned by the button, substantially as described.

8. A horseshoe provided with a foot-turning bearing consisting of button $a$ having a rounded under surface applied to the treading surface of the inner half of the shoe projecting downwardly beyond the other portions of the shoe and adapted under the weight of the horse to turn its foot as it strikes the ground toe inward, substantially as described.

9. A horseshoe provided upon the inner side of its inner half with extension $d$ and having a foot-turning bearing consisting of a button $a$ provided with shank $b$ and the opening $c$ for receiving said shank, substantially as described.

10. A horseshoe provided upon the inner side of its inner half with extension $d$, opening $c$, drilled through the shoe and said extension, foot-turning button $a$, and shank $b$ passing into said opening, substantially as described.

11. A horseshoe provided upon the inner side of its inner half with extension $d$, screw-threaded opening $c$ drilled through the shoe and said extension, foot-turning button $a$, and screw-threaded shank $b$ passing into said opening, substantially as described.

12. A horseshoe provided with a rounded foot-turning bearing at the forward portion of the inner half of the shoe projecting downwardly beyond the treading surface of the shoe and adapted under the weight of the horse to turn its foot, as it strikes the ground, toe inward, the inner half of the shoe being longer than the outer half, substantially as described.

In testimony whereof I have hereunto set my hand in the presence of two subscribing witnesses.

JAMES B. BURR.

Witnesses:
HENRY L. BROWN,
FRANK A. JOHNSON.